United States Patent
Paleschuck

(10) Patent No.: US 7,588,370 B2
(45) Date of Patent: Sep. 15, 2009

(54) AIRCRAFT TRASH COMPACTING BAG

(76) Inventor: Maurice Paleschuck, 22 Park Pl. - Apt. 2M, Great Neck, NY (US) 11021-5014

( * ) Notice: Subject to any disclaimer, the term of this patent is extended or adjusted under 35 U.S.C. 154(b) by 7 days.

(21) Appl. No.: 11/324,661

(22) Filed: Jan. 3, 2006

(65) Prior Publication Data
US 2006/0171612 A1    Aug. 3, 2006

Related U.S. Application Data

(63) Continuation of application No. 10/676,681, filed on Oct. 1, 2003, now Pat. No. 6,994,022.

(51) Int. Cl.
B65D 30/10 (2006.01)
(52) U.S. Cl. .................. 383/121; 383/67; 383/102
(58) Field of Classification Search ................ 383/121, 383/102, 103, 67
See application file for complete search history.

(56) References Cited

U.S. PATENT DOCUMENTS

| | | | |
|---|---|---|---|
| 2,332,768 A * | 10/1943 | Wilcox | 222/565 |
| 3,239,110 A * | 3/1966 | Buter | 222/465.1 |
| 3,368,709 A * | 2/1968 | Clauss | 222/107 |
| 3,567,074 A * | 3/1971 | Brown | 222/107 |
| 3,835,767 A | 9/1974 | Peterson | |
| 3,835,769 A | 9/1974 | Peterson | |
| 3,899,967 A | 8/1975 | Powers | |
| 4,070,962 A | 1/1978 | Peterson | |
| 4,183,295 A | 1/1980 | Peterson | |
| 4,444,099 A | 4/1984 | Paleschuck | |
| 4,576,316 A * | 3/1986 | Foster | 222/541.6 |
| 4,620,479 A | 11/1986 | Diamond et al. | |
| 4,680,808 A | 7/1987 | Paleschuck | |
| 4,700,623 A | 10/1987 | Durbin et al. | |
| 4,719,852 A | 1/1988 | Durbin et al. | |
| 4,729,303 A | 3/1988 | Durbin | |
| 4,919,546 A * | 4/1990 | Imazeki et al. | 383/33 |
| 5,133,607 A * | 7/1992 | Bonke | 383/75 |
| 5,174,468 A * | 12/1992 | Holderman | 220/571 |
| 5,246,110 A * | 9/1993 | Greyvenstein | 206/390 |
| 5,382,516 A * | 1/1995 | Bush et al. | 435/41 |
| 5,465,660 A | 11/1995 | Conti et al. | |
| 5,493,852 A * | 2/1996 | Stewart | 56/16.8 |
| 5,540,500 A * | 7/1996 | Tanaka | 383/43 |
| 5,617,974 A * | 4/1997 | Sawyer, Jr. | 222/107 |
| 5,785,428 A * | 7/1998 | Mazzocchi | 383/103 |
| 6,076,566 A | 6/2000 | Lowe | 141/10 |
| 6,241,388 B1 * | 6/2001 | Terramani | 383/22 |
| 6,296,388 B1 * | 10/2001 | Galomb et al. | 383/63 |
| 6,640,701 B2 | 11/2003 | Hoffjann et al. | |

FOREIGN PATENT DOCUMENTS

JP    05132103 A  *  5/1993
JP    2002036466 A  *  2/2002

* cited by examiner

Primary Examiner—Nathan J Newhouse
Assistant Examiner—Jack H Morgan, Jr.
(74) Attorney, Agent, or Firm—Galgano & Associates, PLLC

(57) ABSTRACT

A generally rectangular trash bag for use in an aircraft trash management system. The trash bag includes a non-porous, generally rectangular flexible side wall and a porous, generally rectangular bottom panel, such that when the trash bag is filled with trash and is compacted, any liquid contained in the trash drains through the porous bottom panel. The porous bottom panel of the trash bag is impregnated with one of a non-leaching anti-bacterial agent and a leaching enzyme.

5 Claims, 13 Drawing Sheets

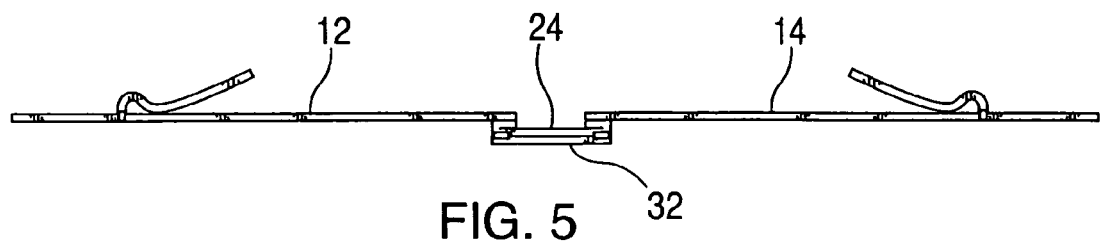
FIG. 5
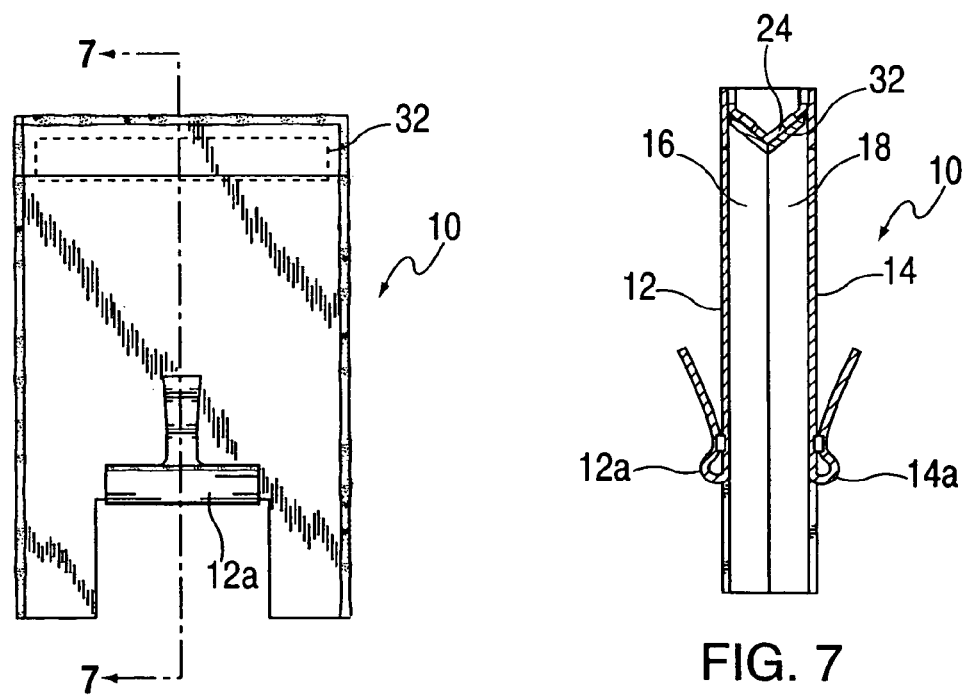
FIG. 6
FIG. 7

AIRCRAFT TRASH COMPACTING BAG

CONTINUING APPLICATION DATA

This application is a continuation of application Ser. No. 10/676,681 filed on Oct. 1, 2003 now U.S. Pat. No. 6,994,022.

BACKGROUND OF THE INVENTION

1. Field of the Invention

The invention relates to a trash collection receptacle and a trash compactor particularly adapted for use in an aircraft.

2. Brief Description of the Prior Art

Capacity of passenger aircraft has increased dramatically over the past thirty years. It is not unusual for some airlines to be equipped to carry a passenger load in excess of five hundred persons, whereas loads in excess of one hundred passengers are a common occurrence, with perhaps as many as thousands of flights a day throughout this country and the rest of the world.

While many flights are short in duration, three or four hours or less, in which only snacks may be served, many flights are of sufficient duration as to require the service of at least one meal to each of the passengers. On other flights, for example, coast-to-coast, and international flights, two or more meals and/or snacks may be served. Much of the equipment used in meal service is made from paper or plastic material designed to be discarded as part of the trash, together with left over food stuffs.

On some flights, this trash is generally collected in plastic bags and stored aboard the aircraft until the flight terminates at which time the bags are removed for disposal. These bags are bulky and at the very least they represent an inconvenience to the crew and passengers as they become filled and their numbers accumulate during the course of the flight.

On lengthy flights, with large passenger loads, especially when there are multiple servings of food, the problem does become acute, so much so that it is not unusual for one or more of the multiple lavatories aboard to be used as rooms for the storage of the bags. This results in further inconvenience for those aboard the aircraft.

One solution to the trash storage problem which has been gaining in acceptance, is that of the installation of a trash compactor onboard the aircraft. To be used onboard an aircraft, however, the trash compactor must be small in size and relatively light in weight, and must meet stringent Federal Aviation Administration (FAA) safety and airworthiness regulations, as well as airframe manufacturer and airline industry requirements. Exemplary of trash compactors specifically designed and intended for use on aircraft are those disclosed in U.S. Pat. Nos. 3,835,767, 3,835,769, 3,899,967, 4,070,962, 4,183,295, 4,444,099, 4,620,479, 4,680,808, 4,700,623, 4,719,852, 4,729,303, and 5,465,660. Some of the prior art compactors use water pressure to effect compacting, others use springs, air pressure, hydraulic fluid, or other means.

My prior U.S. Pat. No. 4,444,099 discloses an airborne refuse compactor in which the pressure difference between cabin pressure and outside atmospheric pressure is utilized to energize the device and to withdraw, during compaction, the liquid content of the refuse through a self-closing valve which is part of and penetrates the wall of the refuse receptacle. The liquid is discharged into the rarefied atmosphere during flight, where it evaporates. The receptacle employed in the compactor is of generally rigid construction in order to conform to the cavity within the compactor and to accommodate the piston and the one-way valve. Thus the receptacles must occupy valuable space aboard the aircraft prior to use in the compactor or be made collapsible at a significant cost.

In addition, the compactor employs a piston or platen filling the entire cross section of the receptacle to compress the refuse within. After a series of cycles, when the receptacle is filled, the latter is removed. A single piston is not capable of adjusting readily to different kinds or densities of the trash over its area with the result that there is sometimes a tendency for the piston to become cocked. Moreover, the single piston along with its actuating structure is complicated and heavy and contributes significantly to the weight of the compactor.

My prior U.S. Pat. No. 4,680,808 discloses a compactor receptacle which improves the performance and usefulness of airborne refuse compactors. The receptacle is far less expensive to manufacture, lacks the need for a valve for the withdrawal of the liquid from the refuse, and can be collapsed completely prior to use, thus occupying very little valuable space.

According to a preferred embodiment the receptacle consists of a bag made from a porous fabric of a hydrophobic or non-wetting material such as nylon and is provided with means to suspend it with the open end up in the compactor. Extended metal arms are provided adjacent the open end of the bag to facilitate insertion and removal of the bag and to guide the sides of the opening during compaction.

The bag resists leakage of the liquid in the trash as the bag is being filled due to the non-wetting characteristics of the fibers, while during compaction the liquid will leak out of the bag and collect in the bottom of the compactor where it can be carried away so that when the bag is full and ready to be removed and discarded the trash is largely free of liquid thereby reducing the effort required in disposing of the trash.

SUMMARY OF THE INVENTION

It is therefore an object of the invention to improve upon the trash bag and trash compactor of my previous patents.

Accordingly, the present invention provides an improved trash bag for use in an aircraft trash compactor, an improved compactor and a new valve for powering the compactor.

The trash bag has a four piece construction which is assembled, folded and heat sealed. The two major pieces are made of non-porous polyethylene and define the sides of the bag. The third piece which forms the bottom of the polyethylene bag is perforated and covered with the fourth piece. The fourth piece is made of high strength, controlled porosity, non-woven polypropylene which is treated with two agents prior to heat sealing it, preferably heat sealing its peripheral border or rim to the inner surface of the bottom of the bag. The agents include a non-leaching antimicrobial and a leaching enzyme. The purpose of the antimicrobial agent is to provide a barrier to disease causing bacteria which might otherwise exit the bag with the liquid trash as the liquid is removed during compaction. The purpose of the enzyme is to react with and break down plaque which often builds up in the grey water line of an aircraft. (The grey water line is the vacuum drain system which drains water from sinks throughout the aircraft. Grey water is released into the atmosphere during flight and evaporates.)

The upper portion of the bag is fabricated with tails and flaps such that a handle is formed for lifting the bag when it is removed from the compactor. Tunnels are formed by two heat seals and are used to hang the bag on support arms inside the compactor. Flaps are provided at either end of the top of the bag to close the bag when full of compacted trash prior to removal from the compactor. Tails are tied in a knot over the flaps and form a handle to lift the bag from the compactor and carry it off the aircraft. According to the presently preferred embodiment, the top of the bag beneath the handle is provided with a ZIPLOCK closure.

Since the upper portion of the bag is non-porous and only the bottom is porous, all of the liquid exits the bag through the bottom which, when used with the compactor of the invention, is adjacent the liquid exit port of the compactor.

According to the presently preferred embodiment, the bottom of the bag is heat sealed approximately one half inch from the bottom folds. This increases the strength of the bag.

The compactor is operated with a three position valve. When the valve is moved from the first (off) position to the second (compact) position, the upper outlet of the compacting chamber is coupled to the interior of the plunger of the modified bilge drain valve. At altitude, this causes the air inside the compacting chamber to exit the chamber to the outside atmosphere. Due to the pressure differential between atmospheric pressure and cabin pressure, the compactor crusher plate is moved against the springs and compacts the trash in the bag in the compacting chamber against the opposite wall of the compactor cabinet. When the valve is moved back to the off position the upper outlet is coupled to cabin pressure, the springs pull the plate back and the compacted trash falls to the bottom of the bag. When the valve is moved to the third (drain) position, the bottom of the compacting chamber is coupled to the aircraft grey water system and the liquid at the bottom of the chamber is drained from the compactor.

The bellows is held in a non-compacted position by four coil springs and the interior and exterior of the bellows exposed to cabin pressure. One end of the bellows is attached and sealed to the compactor crusher plate. The other end of the bellows is attached and sealed to the compactor side wall which has a central opening in it. This allows cabin pressure to act on both the inner and outer bellows working areas when the compactor control valve is in the off position. When the compactor control valve is in the compact or drain positions, cabin pressure acts on the inner working area while outside atmospheric pressure acts on the outer working area of the bellows. There is one valved outlet at the bottom of the compacting chamber and another above the bottom of the chamber. The lower outlet is selectively coupled to the grey water disposal system of the aircraft and the upper outlet is selectively coupled to a modified bilge drain valve in the belly of the aircraft.

According to the invention, the modified bilge drain valve supplies power to the compactor via differential pressure. The valve assembly includes a sleeve containing a plunger which is held in an open position by a spring. Differential pressure acting across an annular area overcomes the spring and moves the plunger to the closed position when altitude increases to approximately 5,000 feet, at which there is approximately two psi difference between cabin and outside pressure. According to the invention, the plunger is hollow. The interior of the plunger is exposed to the outside atmosphere and selectively coupled to the upper outlet of the compacting chamber.

The compactor is operated with a three position valve. When the valve is moved from the first (off) position to the second (compact) position, the upper outlet of the compacting chamber is coupled to the interior of the plunger of the modified bilge drain valve. At altitude, this causes the air inside the compacting chamber to exit the chamber to the outside atmosphere. Due to the pressure differential between atmospheric pressure and cabin pressure, the compactor crusher plate is moved against the springs and compacts the trash in the bag in the compacting chamber against the opposite wall of the compactor cabinet. When the valve is moved back to the off position the upper outlet is coupled to cabin pressure, the springs pull the plate back and the compacted trash falls to the bottom of the bag. When the valve is moved to the third (drain) position, the bottom of the compacting chamber is coupled to the aircraft grey water system and the liquid at the bottom of the chamber is drained from the compactor.

INCORPORATION BY REFERENCE

The complete disclosures of all of the above listed patents are hereby incorporated by reference herein.

BRIEF DESCRIPTION OF THE DRAWINGS

FIG. 5 is a side view of the four pieces partially assembled;

FIG. 6 is an upside down view of the trash receptacle fully assembled;

FIG. 7 is a section taken along the line 7-7 in FIG. 6;

DETAILED DESCRIPTION

Figure 1:
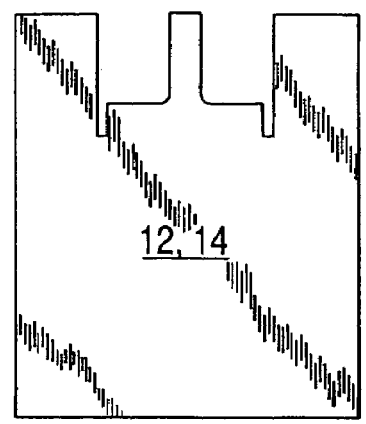
FIG. 1 is a plan view of one of the two major pieces of the trash receptacle.
Figure 2:
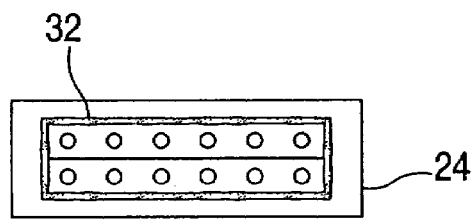
FIG. 2 is a transparent plan view of the bottom of the trash receptacle.
Figure 3:
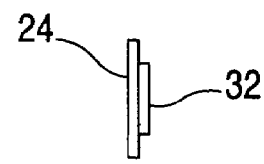
FIG. 3 is a side view of the bottom of the trash receptacle, illustrating two layers.
Figure 4:
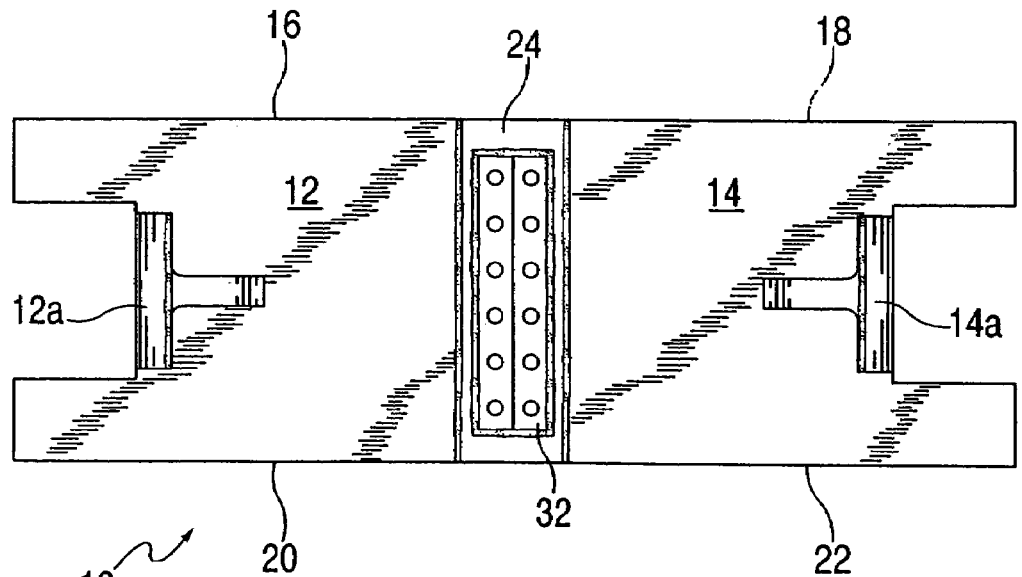
FIG. 4 is a plan view of the four pieces partially assembled.

Turning now to FIGS. 1-11, a trash bag 10 according to the invention includes three sheets of non-porous polyethylene which is folded and heat sealed to form six sides 12, 14, 16, 18, 20, 22, and a bottom 24. The bottom 24 is perforated so that liquid may drain from the bag.

According to the preferred embodiment, the perforated bottom 24 is covered with the second piece 32 made of high strength, controlled porosity, non-woven polypropylene which is treated with two agents prior to heat sealing it to the inner surface of the bottom 24 of the bag 10. Second piece 32 is preferably provided with a heat-sealable border 33 by which it is heat sealed to the minor surface 24 of bag 10. The agents include a non-leaching antimicrobial and a leaching enzyme. The purpose of the antimicrobial agent is to provide a barrier to disease causing bacteria which might otherwise exit the bag with the liquid trash as the liquid is removed during compaction. The purpose of the enzyme is to react with and break down plaque which often builds up in the aircraft grey water line through which the liquid trash is expelled.

Figure 9:
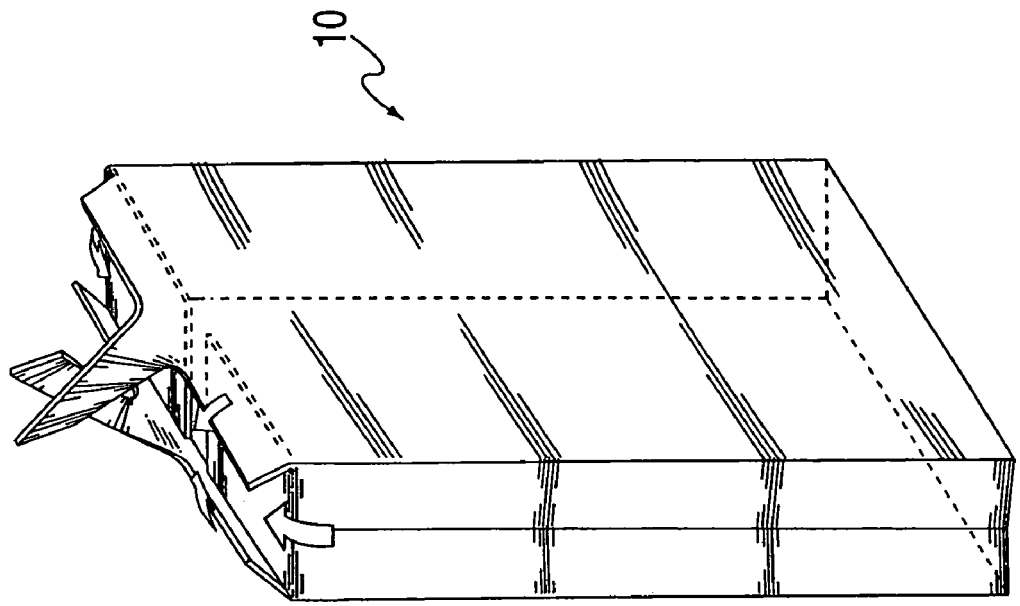
FIG. 9 is a view similar to FIG. 8 with the flaps closed and tied.
Figure 8:
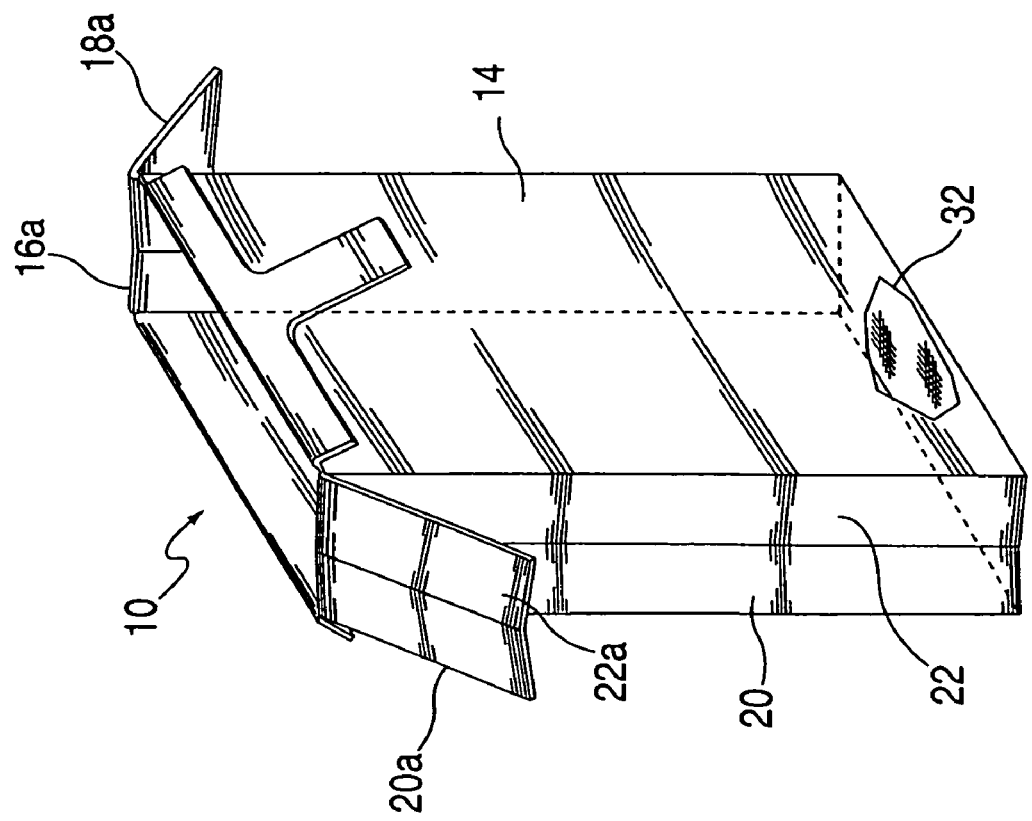
FIG. 8 is a perspective view of the receptacle fully assembled.
Figure 11:
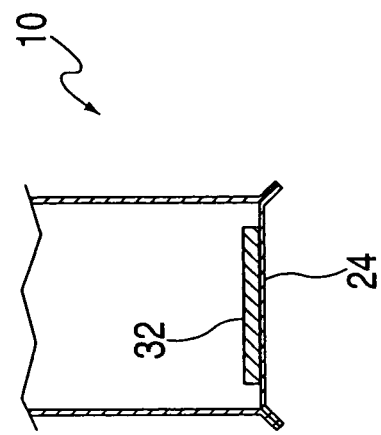
FIG. 11 is a broken cross sectional view of the receptacle illustrating the double layered bottom.

The upper portion of the bag 10 is fabricated with tails and flaps such that a handle is formed for lifting the bag when it is removed from the compactor. Tunnels 12a, 14a are formed by two heat seals and are used to hang the bag on support arms inside the compactor described below with reference to FIGS. 12-17. Flaps (16a, 18a, 20a, 22a) are provided at opposite ends of the top of the bag to close the bag when full of compacted trash prior to removal from the compactor. Tails (at the top of panels 14 and 20) are tied in a knot over the flaps as shown in FIG. 9 and form a handle to lift the bag from the compactor and carry it off the aircraft.

Figure 10:
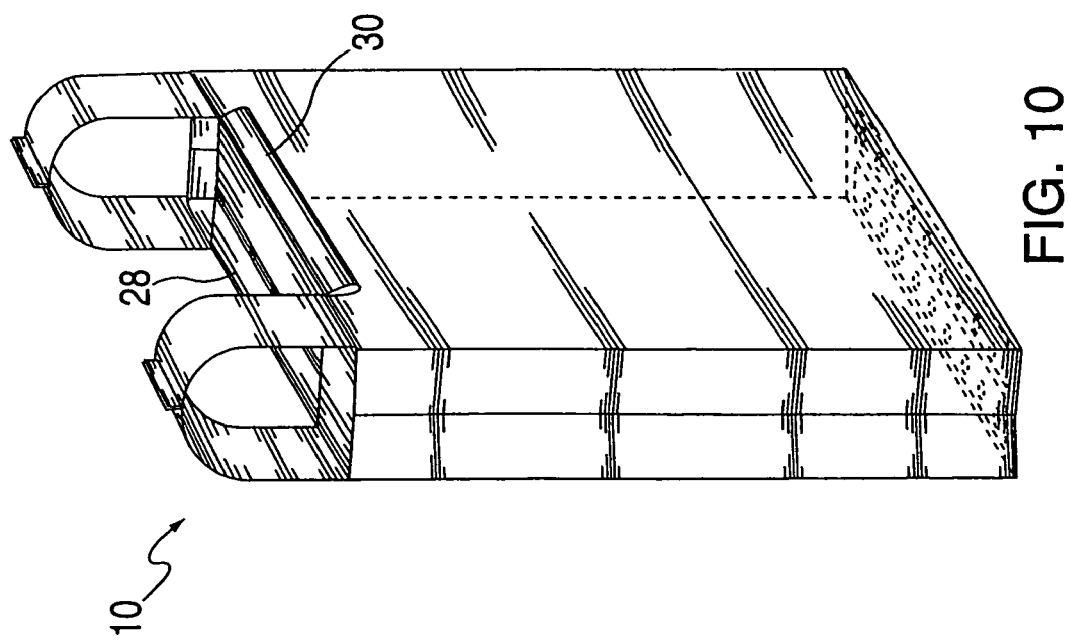
FIG. 10 is a perspective view of an embodiment of the receptacle illustrating draw strings and ZIPLOCK closure.
Figures 12, 13:
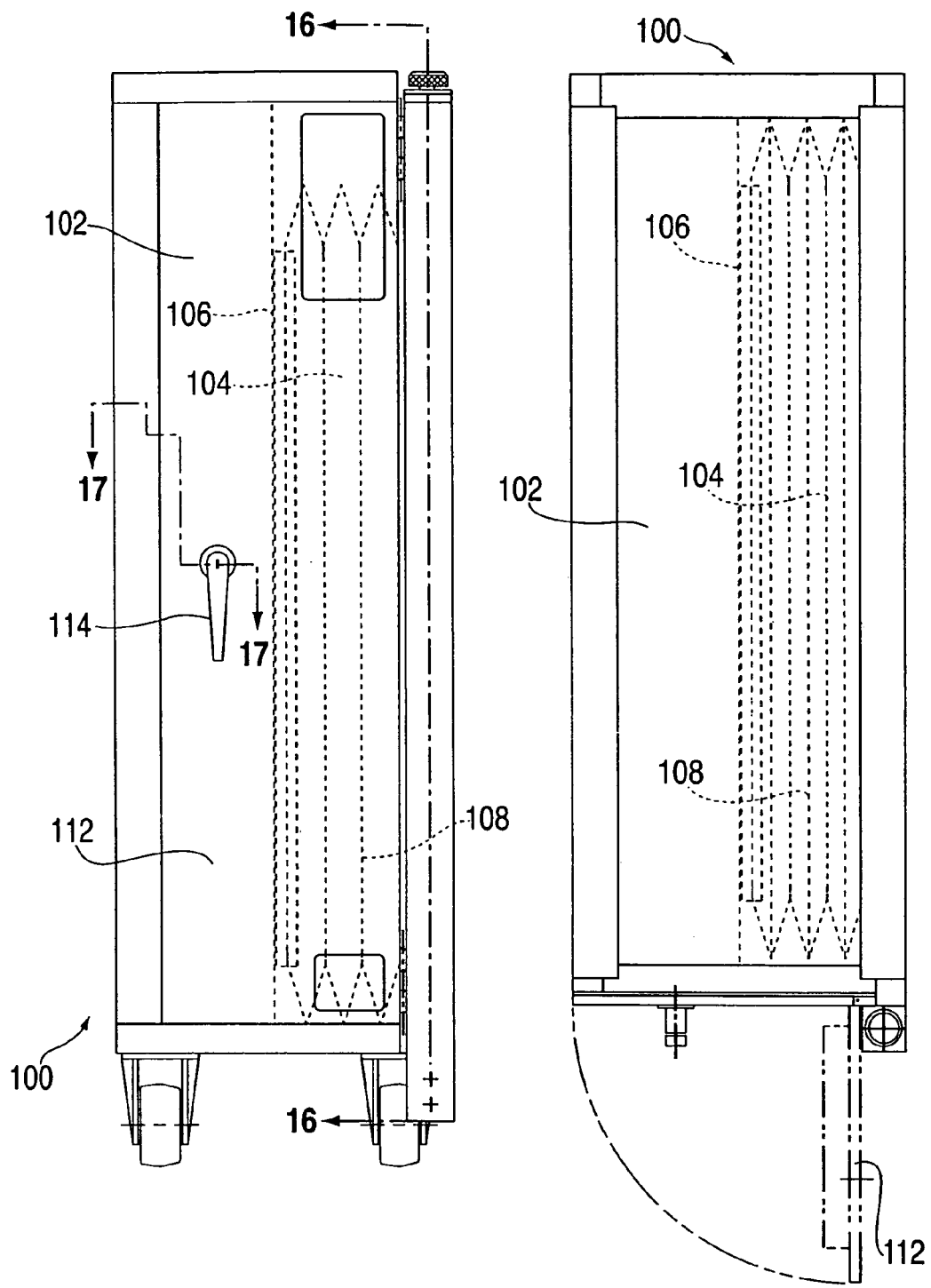
FIG. 12. is an end view of the front of the compactor of the invention.
FIG. 13 is a top view of the compactor.
Figure 14:
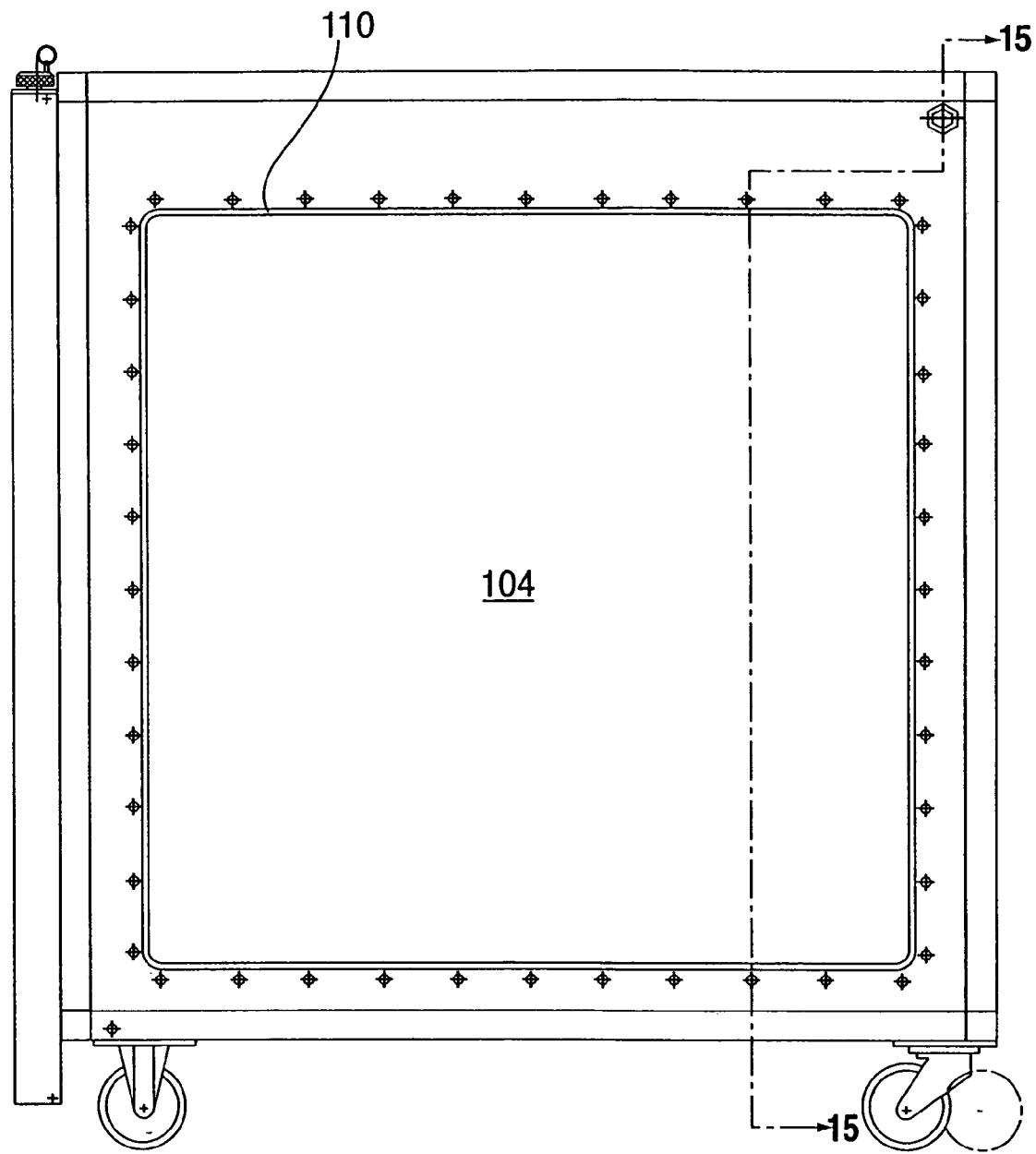
FIG. 14 is a side view of the compactor.

According to one embodiment, as shown in FIG. 10, the top of the bag beneath the handle is provided with a ZIPLOCK closure 28, 30.

Since the upper portion of the bag is non-porous and only the bottom is porous, all of the liquid exits the bag through the bottom which, when used with the compactor of the invention, is adjacent the liquid exit port of the compactor described in detail below with reference to FIGS. 12-17. According to the presently preferred embodiment, the bottom of the bag is heat sealed approximately one half inch from the bottom folds. This increases the strength of the bag.

Turning now to FIGS. 12-17 and 20, the compactor 100 according to the invention is a rectangular box which is substantially the same size as a standard food service cart. The box defines two compartments 102, 104 separated from each other by a movable wall (crusher plate) 106 (seen best in FIGS. 15a, 15b). The compartment 104 contains a bellows 108 the interior of which is open to cabin atmosphere via the large opening 110 on one side of the compactor and is attached to the movable wall (crusher plate) 106. A door 112 with a locking handle 114 allows access to the compartment 102. The opening 110 is a peripheral slot 1/32 inch wide to prevent mice or other pests associated with food service from entering the compartment 104.

Figure 15A:
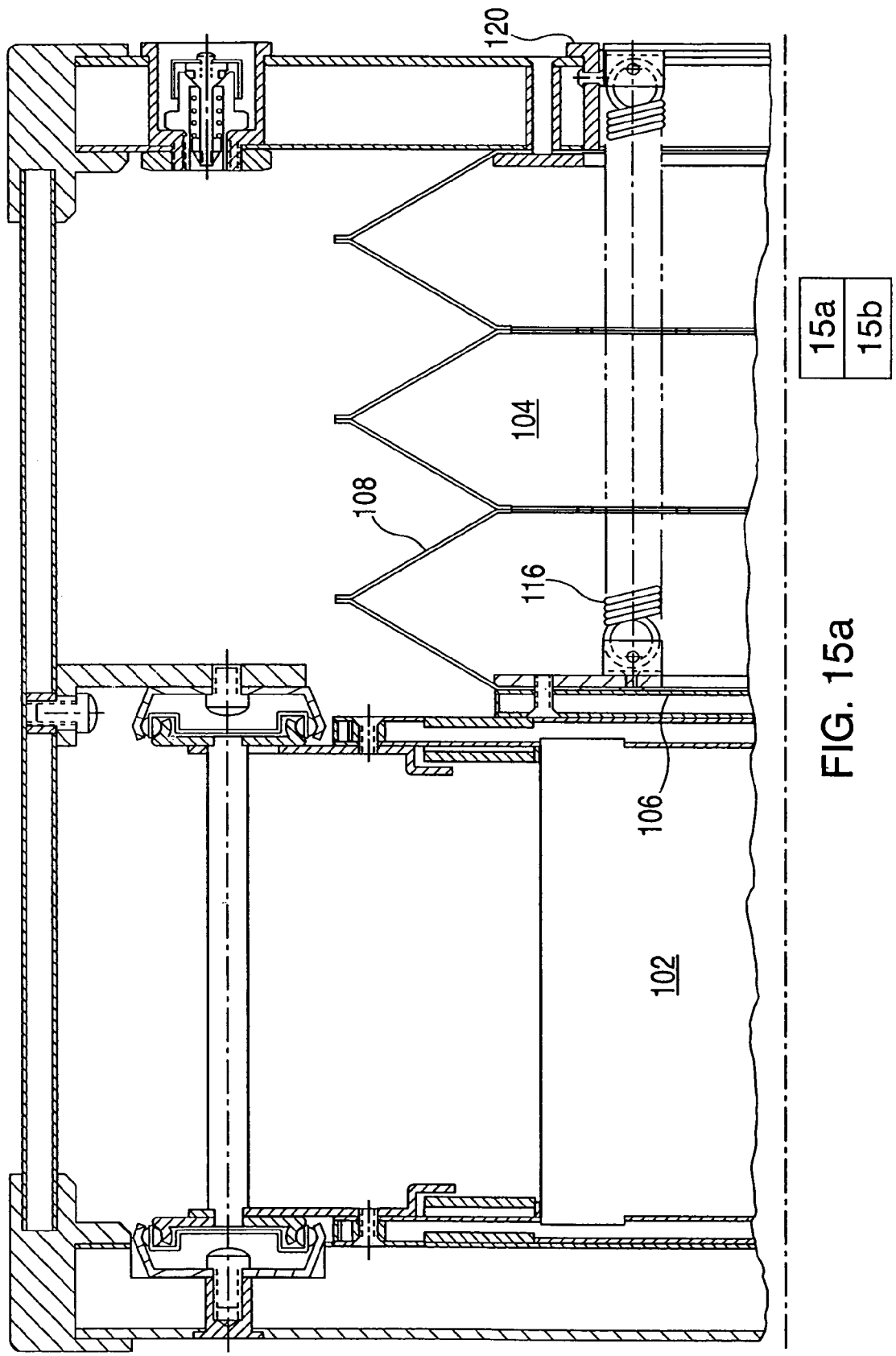
FIGS. 15a and 15b illustrate the section taken along line 15-15 in FIG. 14.
Figure 15B:
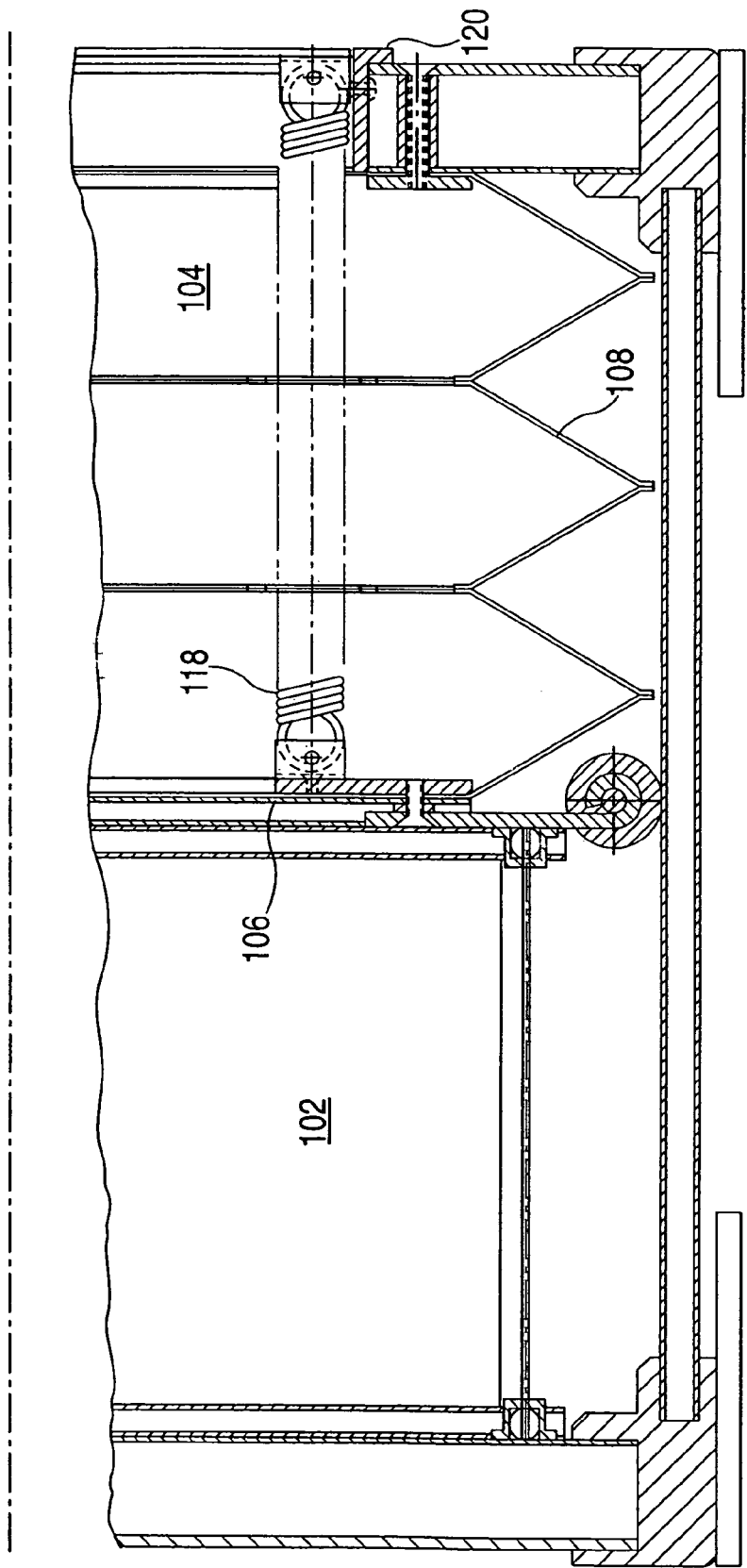

As seen best in FIGS. 15a and 15b, springs 116, 118 are attached to the movable wall (crusher plate) 106 and to the side wall 120 of the compactor. The springs hold the movable wall (crusher plate) 106 in the position shown in the figures defining the compartment 102 dimensioned to receive the trash bags described above.

Figure 16:
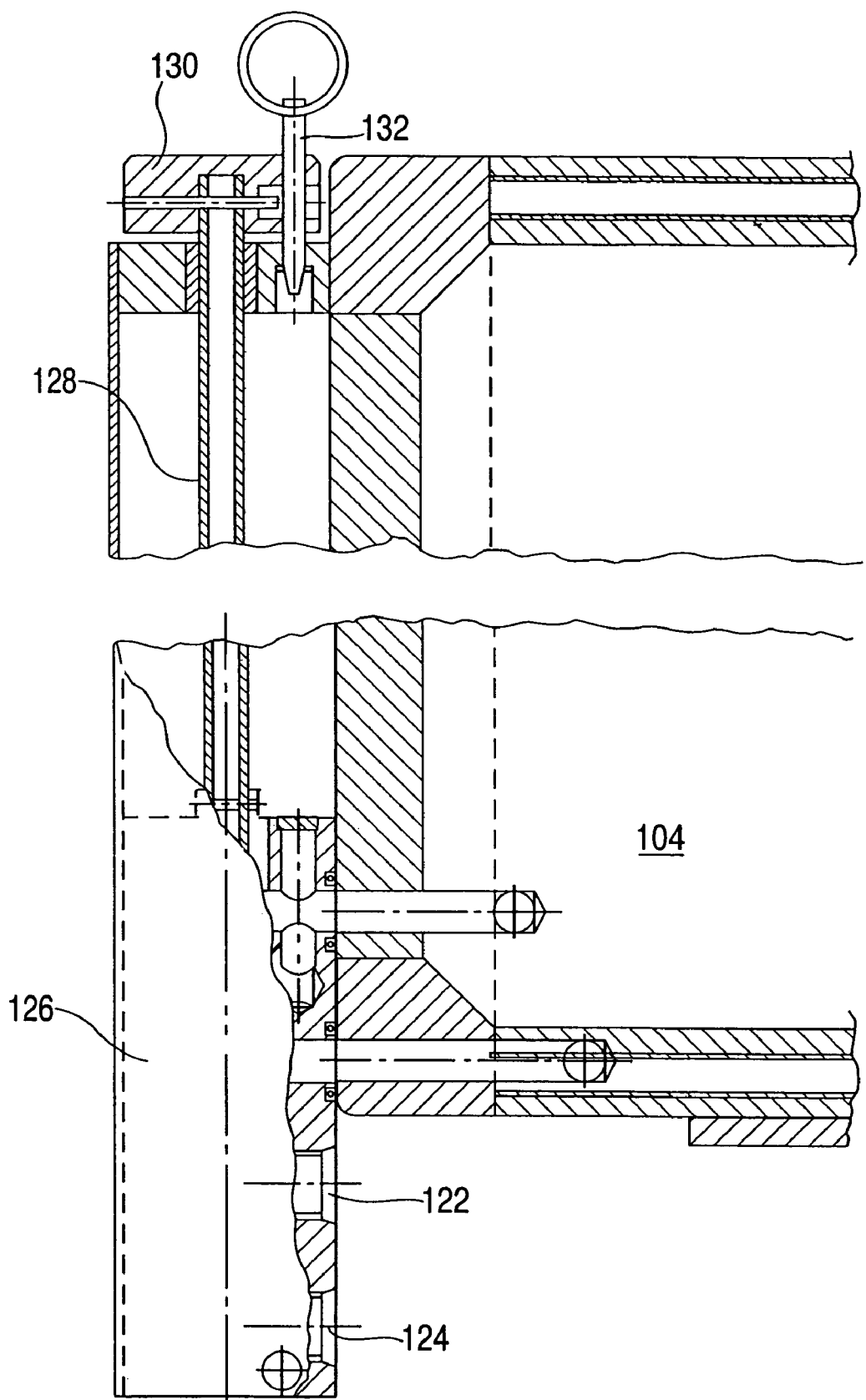
FIG. 16 is a broken section taken along the line 16-16 in FIG. 12.
Figure 20:
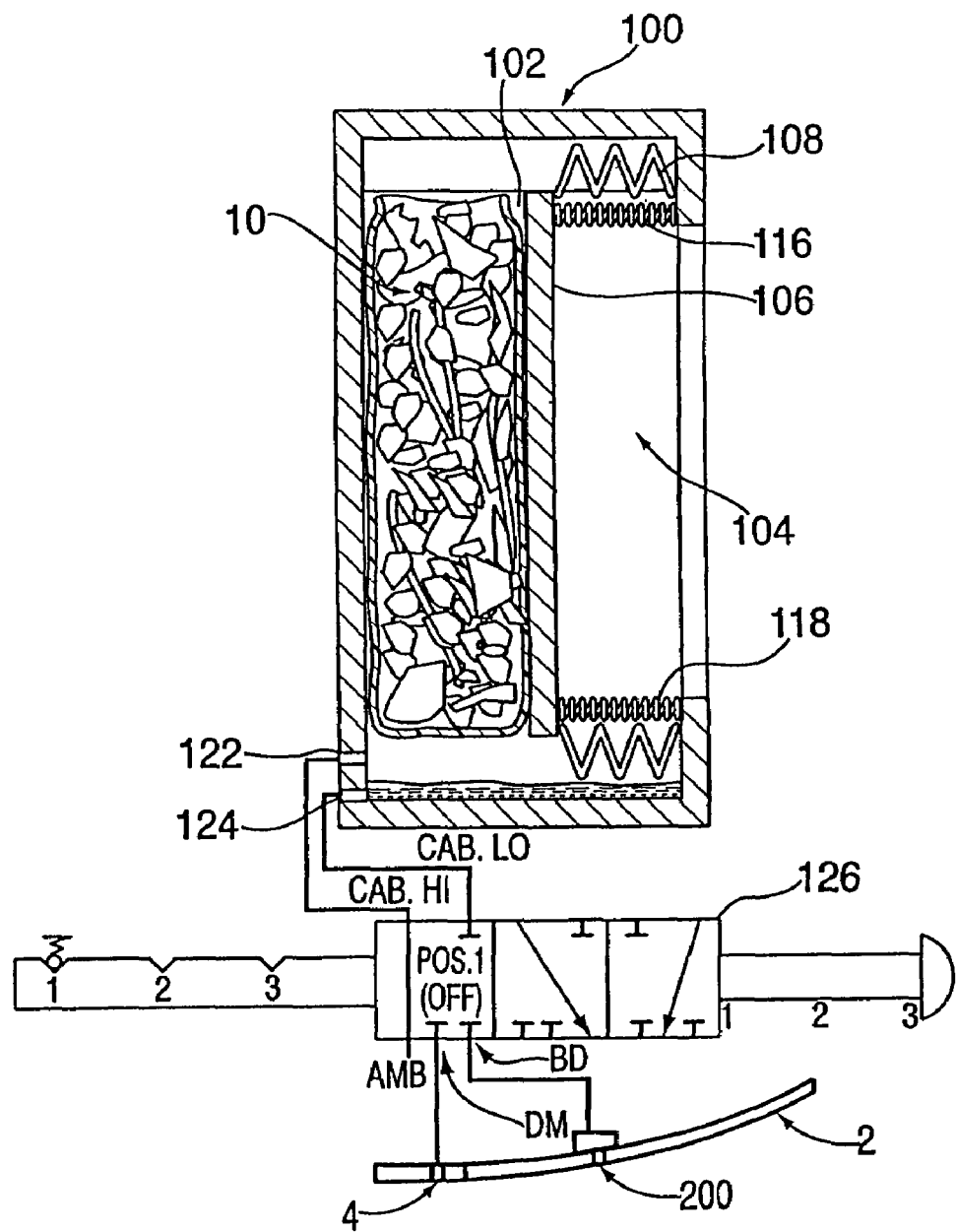
FIG. 20 is a schematic diagram illustrating all of the components of the invention.

As seen best in FIGS. 16 and 20, two ports 122, 124 are located at the bottom of the compactor and in fluid communication with compartment 102. These ports are selectively coupled to the aircraft drain mast (grey water line) and modified bilge drain valve, respectively, via a control valve assembly 126 which is coupled by a vertical shaft (tube) 128 to a knob 130 which has a locking pin 132.

Figure 17:
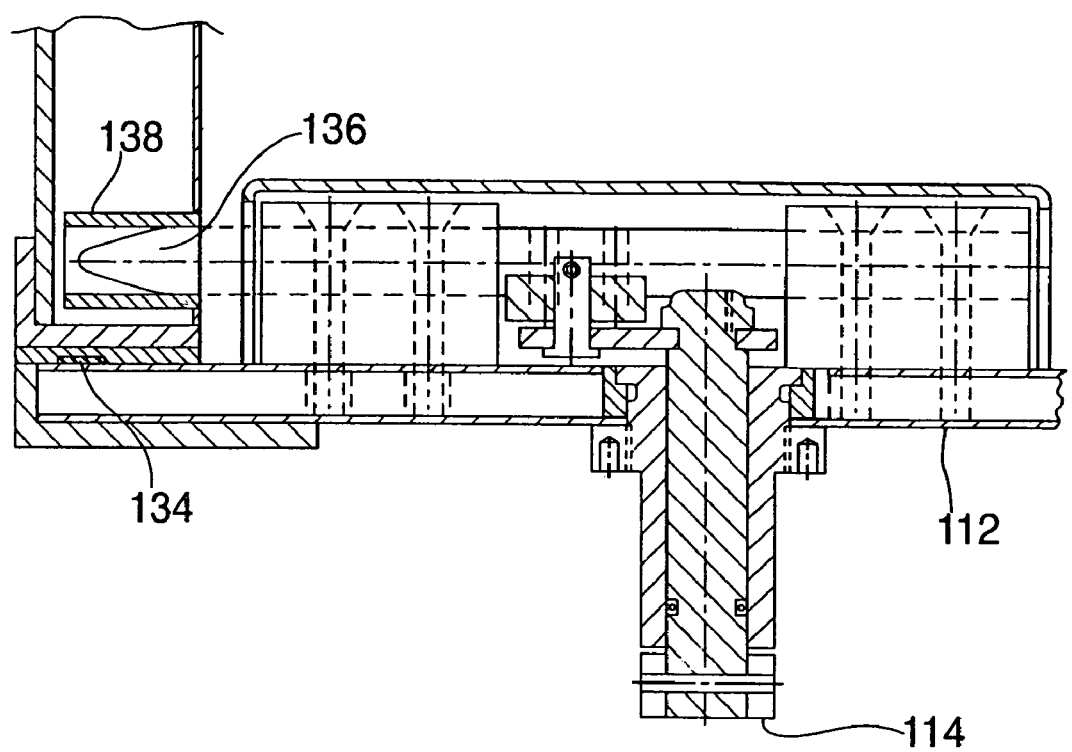
FIG. 17 is a broken section taken along line 17-17 in FIG. 12.

As seen best in FIG. 17, the door 112 cooperates with a sealing gasket 134 which surrounds the opening to compartment 102. The door handle 114 engages a latching pin 136 which is movable into and out of the latch socket 138. The pin 136 is tapered so that as it is moved into the socket 138 the door 112 is pressed firm against the gasket 134

Figure 19:
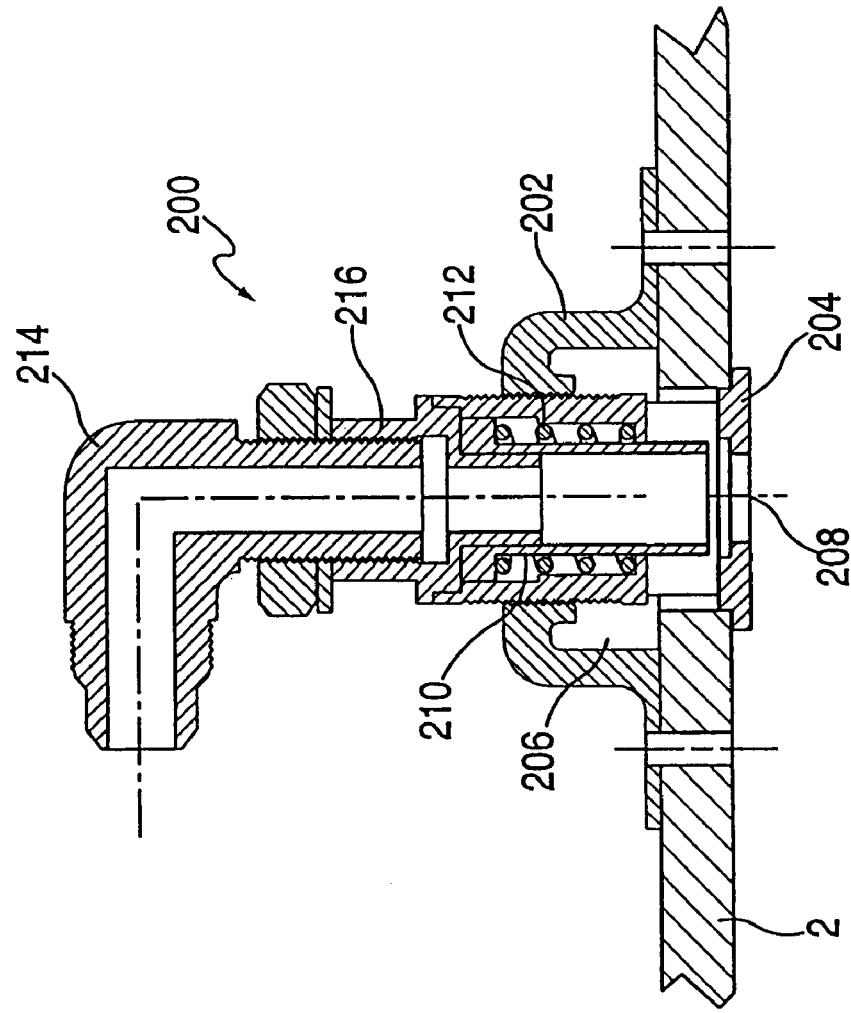
FIG. 19 is a section taken along line 19-19 in FIG. 18 and showing as portion of aircraft fuselage.
Figure 18:
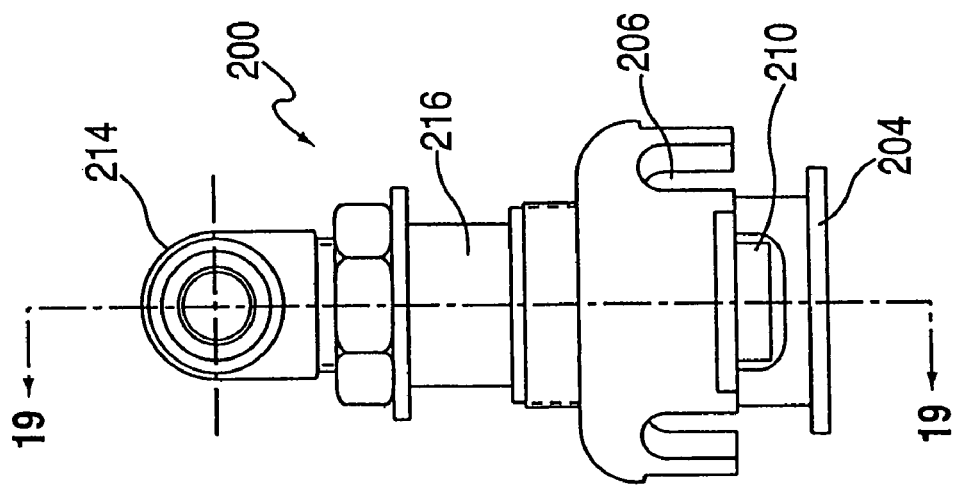
FIG. 18 is a side elevation view of a modified bilge drain valve according to the invention.

Prior to discussing the operation of the compactor, the valve 200 shown in FIGS. 18 and 19 should be understood. The valve 200 has in inner annular flange 202 and an outer flange 204 which embrace the fuselage 2 of an aircraft. The outer flange 204 has a throughbore 208 which is in fluid communication with the annular space 206 thereby providing a fluid path from the inside of the aircraft to the outside atmosphere. A spring biased plunger 210 is movable against the spring 212 from the position shown in the figures to a position which blocks the fluid connection between the bore 208 and the annular space 206. In a state of the art bilge drain (not shown) the plunger is solid and is moved against the spring when the difference between cabin pressure and atmospheric pressure is increased as the aircraft gains altitude. When the aircraft descends prior to landing, the valve opens and allows water which condensed inside the aircraft to drain. In medium sized aircraft there are fifty to one hundred bilge drain valves on the bottom of the fuselage.

According to the invention, the plunger 210 is hollow and forms a fluid path through an elbow joint 214. Thus, when the aircraft reaches altitude, the bilge valve closes but the fluid path through the elbow 214 remains in fluid communication with the outside atmosphere. According to the presently preferred embodiment, a threaded sleeve 216 is provided and the moving parts of the valve are supplied as a replaceable cartridge accessible via the threaded sleeve.

Referring now to FIG. 20, the compactor 100 of the invention is illustrated containing a trash filled bag 10 in the compartment 102 and a schematic illustration of value assembly 126 coupled to the ports 122, 124, the modified bilge valve 200 and the grey water drain mast 4.

The valve assembly 126 has three positions. In the first "off" position, the upper port 122 is coupled to ambient cabin pressure and the lower port 124 is closed. When the valve is moved from the first (off) position to the second (compact) position, the upper port 122 of the compacting chamber is coupled to the elbow 214 of the modified bilge valve 200. At altitude, this causes the air inside the compacting chamber 102 to exit the chamber to the outside atmosphere. Due to the pressure differential between atmospheric pressure and cabin pressure, the crusher plate 106 is moved against the springs 116, 118 and compacts the trash in the bag 10 in the compacting chamber. As this is happening, liquid trash will accumulate in the bottom of the chamber 102. The position of the port 122 above the bottom of the chamber 102 assures that no liquid trash is allowed to exit through the bilge valve. When the valve assembly is moved back to the off position the upper port 122 is coupled to cabin pressure, the springs pull the crusher plate back and the compacted trash falls to the bottom of the bag 10. When the valve assembly is moved to the third (drain) position, the bottom of the compacting chamber 102 is coupled via the lower port 124 to the aircraft grey water system 4 and the liquid at the bottom of the chamber is drained from the compactor.

Those skilled in the art will appreciate that in order for the compactor to function properly, the door 112 must seal the chamber 102 from cabin pressure. This is effected by the gasket 134 shown in FIG. 17. The nature of the gasket 134 is such that if any article of clothing or even the hair of the operator is between the door and the gasket, a proper seal will not be made and the compactor will not operate.

Figure 21:
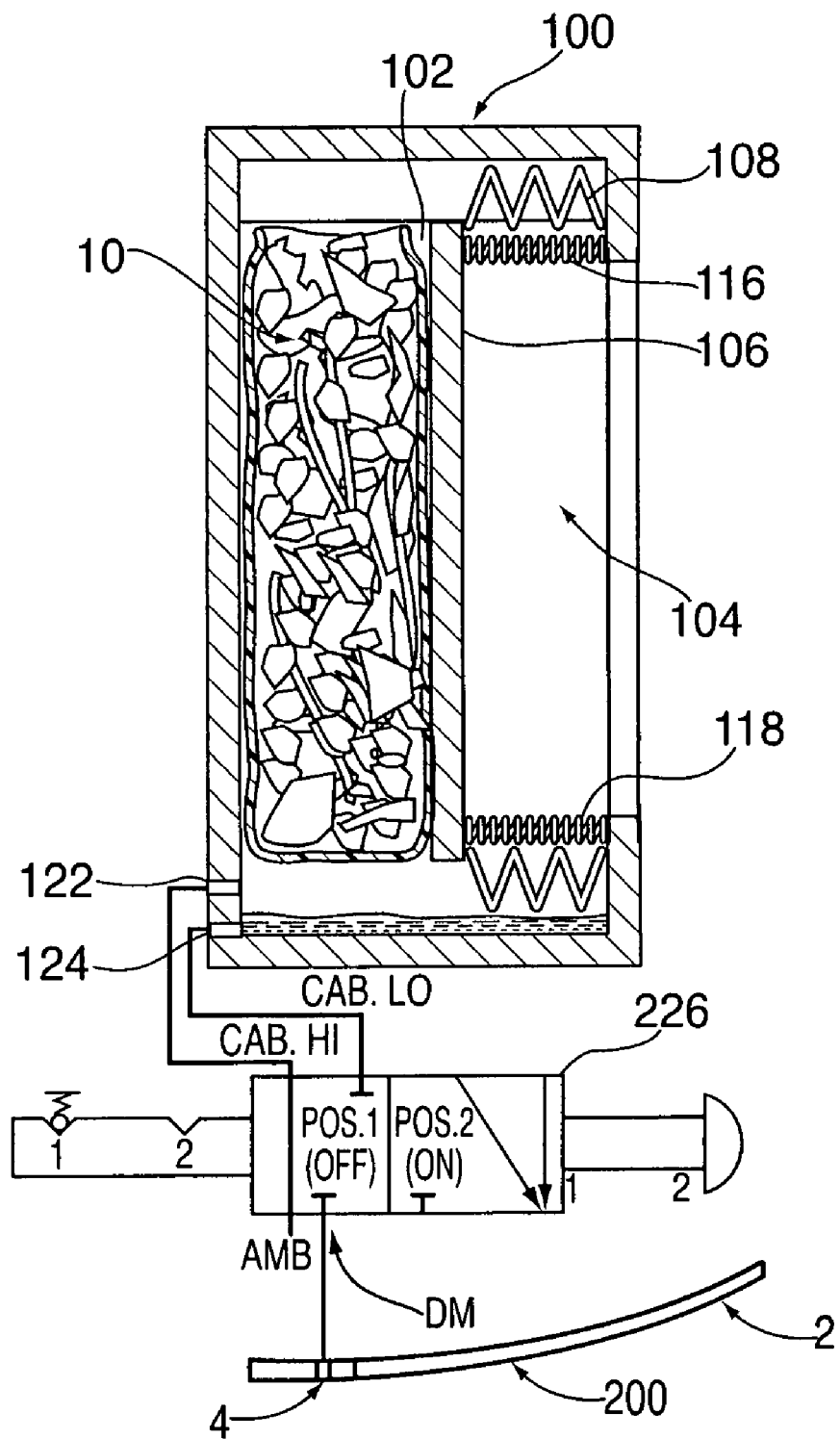
FIG. 21 is a schematic diagram similar to FIG. 20 illustrating an alternate embodiment of the control valve assembly.

An alternate control valve assembly is a rotary, four port, two position direction control valve. Its functions can more easily be seen and understood by viewing FIG. 21 which is a schematic diagram of a comparable linear four port, two position direction control valve. The two valve positions and the internal porting passages are shown. The four ports are "cab hi", "cab lo", "amb", and "dm", as shown. The valve is detented in position 1 (off), "cab hi" is connected to "amb", and "cab lo" and "dm" blocked. By pushing on the "manual" button the valve advances from position 1 to position 2 and the detent changes its point of application from detent point 1 to point 2. In position 2 (compact and drain), "cab hi" and "cab lo" are connected to "dm" and "amb" is blocked.

With the control valve assembly in position 1 (off) as shown above ambient cabin pressure is present inside the compactor and acts on both the inner and outer surfaces of the compactor bellows 108. The net effect is zero and the return springs 116, 118 hold the bellows and crusher plate assembly 106 in the retracted (off) position. It is in this position that the mouth of the trash bag 10 is open and is filled with trash. Once the bag is filled the compactor door is closed and bolted. The control valve 226 is moved to Position 2 (compact and drain). This internally blocks "amb" and opens "cab hi" and "cab lo" to "dm". The "dm" port of the control valve assembly 226 is connected to the drain mast plumbing of the aircraft and allows outside atmospheric pressure into the compactor cabinet. The volume between the inside of the compactor cabinet 100 and the outer surface of the compactor bellows 108 is exposed to this outside atmospheric pressure. The differential pressure (cabin pressure minus outside atmospheric pressure) acting over the working area of the bellows causes the bellows to extend. The bellows, which is attached to the crusher plate 106 drives the crusher plate which compacts the trash in the trash bag 10 against the compactor cabinet wall. As part of the compacting process, and by gravity, liquid in the trash falls to the bottom of the trash bag. The outside atmospheric pressure present inside the compactor cabinet sucks the liquid through the porous trash bag bottom and discharges it thru the existing aircraft gray water line to the drain mast where it is vaporized when leaving the aircraft.

After "compact and drain" functions have been completed valve position 1 (off) is selected. This allows "dm" to be blocked and allows the pressure acting over the bellows outer surface to rise and become equal to the cabin pressure acting over the bellows outer surface. As the differential pressure acting over the working area of the bellows approaches zero the return springs 116, 118 retract the bellows and the attached crusher plate 106. The dry compacted trash in the trash bag falls to the bottom of the bag.

Since the differential pressure has dropped to zero the force keeping the door sealed becomes zero and the compactor door can be opened, the entire process can be repeated as many times as necessary to fill the trash bag with compacted, dry trash.

The alternate embodiment of the control valve assembly is simpler in design and construction. It is smaller, weighs less and is less expensive to manufacture. It is more reliable and is easier to install. It involves fewer plumbing connections and can be installed and removed quickly.

There have been described and illustrated herein an aircraft trash management system including a trash bag, a trash compactor, and a modified bilge drain valve. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. An aircraft trash compacting bag for use in an onboard airline trash compactor, having a compacting chamber, means for laterally compacting materials disposed within said chamber and a liquid exit port at the bottom of said chamber, comprising:
   a generally rectangular cuboid-shaped, disposable trash bag which is configured and dimensioned to be disposed within the onboard aircraft trash compactor compacting chamber, wherein said trash bag comprises:
   four non-perforated and non-porous, generally rectangular flexible side walls, each having a base edge; and
   a generally rectangular planar, bottom panel having a perforated outer layer made of a non-porous polyethylene material which is affixed along its perimeter to said base edges of said side walls, and a generally rectangular inner layer made of controlled porosity, non-woven polypropylene which is affixed to said outer layer of said bottom panel, such that when said trash bag is filled with trash and is laterally compacted by the compacting means of said compacting chamber, any liquid contained in the trash drains through said inner layer of said bottom panel and exits said bag through said perforated outer layer of said bottom panel to exit the compacting chamber and wherein said inner layer of said bottom panel of said trash bag is impregnated with a non-leaching anti-bacterial agent and a leaching enzyme.

2. The aircraft trash compacting bag according to claim 1, wherein:
   each of said side walls of said trash bag defines a first end and a second end, said first end being coupled to said bottom panel of said trash bag and said second end being provided with closure means.

3. The aircraft trash compacting bag according to claim 2, wherein:
   said closure means of said trash bag includes a pair of tails adapted to be tied together.

4. The aircraft trash compacting bag according to claim 2, wherein:
   said closure means of said trash bag includes a zipper.

5. The aircraft trash compacting bag according to claim 1, wherein:
   said side walls of said trash bag are polyethylene.

* * * * *